US006027240A

United States Patent [19]

Han

[11] Patent Number: 6,027,240

[45] Date of Patent: Feb. 22, 2000

[54] APPARATUS AND METHOD FOR PRECISE MIXING, DELIVERY AND TRANSFER OF CHEMICALS

[76] Inventor: Leon M. Han, 2148 Port Way, San Jose, Calif. 95133

[21] Appl. No.: 09/066,263

[22] Filed: Apr. 24, 1998

[51] Int. Cl.[7] .......................... G05D 11/02; E03B 11/00; B01F 15/02; B01F 5/00

[52] U.S. Cl. ...................... 366/101; 366/152.1; 366/336; 137/579

[58] Field of Search .................................... 366/101, 108, 366/114, 115, 130, 131, 151.1, 151.2, 152.1, 152.2, 152.6, 153.1, 160.1, 160.5, 177.1, 179.1, 181.1, 181.2, 181.3, 182.1, 182.3, 184, 189, 336, 341; 137/98, 101.25, 101.29, 577, 579

[56] References Cited

U.S. PATENT DOCUMENTS

| | | | |
|---|---|---|---|
| 241,033 | 5/1881 | Lewis | 137/579 |
| 1,516,802 | 11/1924 | Wellman et al. | 137/579 |
| 1,626,782 | 5/1927 | Brooks | 137/577 |
| 2,314,166 | 3/1943 | Selvig | 366/181.2 |
| 2,622,736 | 12/1952 | Way | 137/579 |
| 4,198,168 | 4/1980 | Penn | 366/336 |

FOREIGN PATENT DOCUMENTS

| | | | |
|---|---|---|---|
| 2740765 | 3/1979 | Germany | 366/336 |
| 54-108063 | 8/1979 | Japan | 366/336 |
| 1604394 | 11/1990 | U.S.S.R. | 366/336 |

*Primary Examiner*—Tony G. Soohoo
*Attorney, Agent, or Firm*—Chi Ping Chang

[57] ABSTRACT

The present invention provides improved apparatus and process for the dilution and delivery of both high-purity chemicals as well as slurry chemicals from one or more bulk sources to an end-user. The present system utilizes two or more metered vessels which are connected to bulk chemical sources via intake lines. Each metered vessel contains an adjustable, swingable angle pipe, which drains any excess chemical by gravity flow from the metered vessel so as to adjust the chemical amount to a predetermined desired level. As the chemicals exit the angle pipes, sensors located at the end of the angle pipes sense the chemical being discharged and trigger the feed pump and valve to shut off, whereby the excess chemicals will continue to drain out until the chemical levels reach the same level as the vent port of the pipe attached to the metered vessels. The chemicals are drawn into the metered vessels from the bulk sources via a feed pump or pressure mechanism. The chemicals are then motivated through dispense lines to the pressure tank vessel for mixing and subsequently being delivered to a storage vessel which, in the case of CMP, may be replaced by a plurality of small diameter vessels to reduce slurry particle agglomeration.

12 Claims, 4 Drawing Sheets

APPARATUS AND METHOD FOR PRECISE MIXING, DELIVERY AND TRANSFER OF CHEMICALS

BACKGROUND OF THE INVENTION

1. Field of the Invention

The present invention relates to an improved apparatus and method for the mixing, dilution, delivery and storage of chemicals within a closed system for wafer cleaning and wafer planarization within the semiconductor manufacturing industry.

2. Description of the Prior Art

Within the semiconductor manufacturing industry today, processes used in the manufacture and production of integrated circuits are extremely sensitive to contamination in the form of particulate, organic and/or metallic impurities. As such, chemical delivery systems which have been developed and utilized for the manufacture and production of wafers must be free of such impurities, down to a level of approximately twenty-five or fewer particles per milliliter, such particles being less than a fraction of a micron in size.

The chemical delivery systems which have been developed to date have proven unsatisfactory in a number of ways. Generally, there are four different types of chemical delivery systems currently in use.

The first type of system is a pump delivery system which utilizes a displacement pump, usually an air powered diaphragm type, whereby chemicals are lifted from a bulk source, driven through the pump and pushed out to the point of end-use.

Unfortunately, however, the pump delivery system has many negative attributes. The system is not suitable for continuous fab-wide operation due to the frequent need for pump maintenance. Moreover, pump failure is inevitable over time with replacement of parts or in whole necessary. Furthermore, the continuous contracting and expanding motion of the pump diaphragm causes degradation of the diaphragm material. The degraded pump material then enters into the chemical process stream, thereby causing contamination in the chemicals. Another drawback is that the pump action also causes massive impulses in the system by causing pulsed chemical flow with the result being unwanted particles forced through the particle filters, thereby increasing the chance of contamination. Finally, the pumps typically used in such systems provide only minimal amounts of lift from the bulk chemical source, which decreases the overall efficiency in the entire system.

Another system in current use is the combination pump/pressure system. Again, a pump mechanism is utilized to provide lift from the bulk chemical source into the system. Under this model, however, the chemicals are then delivered to a pressure vessel, from which gas pressure is utilized to motivate the chemical to the end-use area.

Although the negative aspects of the pump system are diminished somewhat and pump usage is reduced, the pump/pressure system still retains some negative attributes. Heavy pump maintenance is still required and pump failure is still inevitable. Continuous use will still cause pump material to degrade and enter the chemical stream, thereby causing contamination.

Yet another system in use is the vacuum/pressure system. This system utilizes both a vacuum and a pressure mechanism to motivate chemicals through a chemical storage vessel. When a vacuum is created in the vessel by the use of a vacuum pump, the decrease in pressure lifts the chemicals from the bulk source into the system. Alternatively, when pressure is induced in the vessel, chemicals are delivered to the end-use area or to any number of other intermediate vessels. By utilizing more than just a single vessel in the system, demand by the end-user and supply from the chemical bulk source can take place simultaneously. The vacuum pump, which is utilized outside the chemical flow loop, avoids the problems of degradation mentioned above.

The vacuum/pressure system also has its share of drawbacks. While the pump maintenance and degradation problems have been eliminated, other problems arise. The high vacuum and pressure cycle frequency can confuse the system sensors and cause the system to operate out-of-sequence, thereby causing backups on one end and inadequate supply of the chemicals on the other end, eventually causing a system shutdown. Moreover, the vacuum mechanism causes foaming and slurry entrainment problems in the vacuum lines. The vacuum/pressure mechanism puts unnecessary stress on the valves which control the release and buildup of pressure to motivate the chemicals, which in addition to the high cycle frequency, causes the valves to fail. Finally, a mixing stirrer must be utilized to prevent particle agglomeration on the bottom of the storage vessel. The mixing stirrer coating wears out and the mixing stirrer is less efficient at handling agglomeration problems on larger scale vessels and tanks.

The final system generally in use today is the pressure only system. By design, this system utilizes three pressure tanks for continuous fab-wide operation, one large tank for supply and storage of the chemicals and two smaller tanks for alternately receiving and transferring chemicals returning from the end-use area back to the tank. Chemicals are drawn into the system from the bulk source and are motivated by pressure injected into the system. The chemicals proceed into the storage tank, where they await use. When needed, the chemicals are pressure induced to the end-use area, after which they are returned into the smaller vessels. When level sensors utilized on the storage tank indicate that more chemicals are required, the chemicals are transferred into the storage tank from the receiving vessels. The system is simple, with less moving parts, corresponding to less down time. Unfortunately, the current pressure system is not suitable for chemical mechanical planarization ("CMP") delivery due to slurry particle agglomeration which occurs at the bottom of the pressure tank vessels.

The current chemical delivery systems also allow the mixing and dilution of chemicals from more than one batch source before delivery to the end-user. This is accomplished by utilizing pumps, vacuum or pressure to fill two or more metered vessels, whereupon the chemicals are then transferred to a mixing vessel and eventually to the end-user. Unfortunately, however, the current mixing systems may contaminate the chemicals through the mixing mechanism itself.

After the chemicals have been mixed and diluted, the chemicals may also be transferred to an intermediate holding vessel, to be stored for later use. An existing drawback, however, is that the storage tanks cannot currently be utilized in CMP slurry chemical delivery systems due to slurry agglomeration problems which occur in such storage tanks.

As such, it is a primary object of the present invention to provide a chemical delivery system to the semiconductor manufacturing industry which transfers process chemicals in a high state of purity from any bulk source and delivers them in an accurate and contaminant-free manner.

It is an additional object of the present invention to provide for a chemical delivery system for CMP process chemicals incorporating multiple storage vessels, which eliminate the slurry agglomeration in current systems, so that such chemicals may be stored without risk of CMP slurry agglomeration.

It is another additional object of the present invention to provide such a chemical delivery system that has low maintenance requirements by the significant elimination of many moving parts in existing chemical delivery systems, while increasing the accuracy of chemical dilution and delivery.

SUMMARY OF THE INVENTION

The present invention provides improved apparatus and process for the dilution and delivery of both high-purity chemicals as well as slurry chemicals from one or more bulk sources to an end-user.

In operation, the present system utilizes two or more metered vessels which are connected to bulk chemical sources via intake lines. The chemicals are drawn into the metered vessels from the bulk sources via a feed pump or pressure mechanism. The chemicals are then motivated through dispense lines to the pressure tank vessel for mixing. Each metered vessel operates by filling up to a predetermined point, upon where the chemical draw from the bulk sources is halted.

Each metered vessel contains an adjustable, swingable angle pipe, which drains any excess chemical by gravity flow from the metered vessel so as to adjust the chemical amount to a predetermined desired level. As the chemicals exit the angle pipes, sensors located at the end of the angle pipes sense the chemical being discharged and trigger the feed pump and valve to shut off, whereby the excess chemicals will continue to drain out until the chemical levels reach the same level as the vent port of the pipe attached to the metered vessels. Chemical levels are adjusted in each metered vessel by the simple raising or lowering of the swingable angle pipes which are pivotally attached to a bottom side of the metered vessels. Additionally, vent valves built into the metered vessels further ensure accurate level measurements by allowing for the venting of pressure within the metered vessels to fine-tune the amount of chemicals retained in the metered vessels.

Once the metered vessels are filled to the pre-set levels, the chemicals are then transferred from the metered vessels via a dispense line to the pressure tank, whereby the chemicals are mixed simply by merging together. If desired, the chemicals may be mixed in a separate mixing vessel according to a variety of conventional means. A pressure system is then utilized to efficiently motivate chemicals from the pressure vessel in a smooth manner into a standard storage vessel without pulses normally associated with pump systems.

To address slurry agglomeration problems in the storage vessel associated with delivery of CMP chemicals, a new design for the storage vessel is necessary. The storage vessel for the CMP slurry chemical delivery system is a bundle of multiple parallel interconnected vessels of a small diameter, the effect of which is to eliminate eventual particle agglomeration problems evident in standard size storage vessels. Generally, the larger the diameter of the storage vessel, the more surface area is evident at the bottom of such vessel, providing for more area for particles to accumulate. By utilizing multiple smaller diameter vessels to replace one large storage vessel, the surface area problem is addressed. Furthermore, the chemicals are motivated through the storage vessels through openings at the bottom of the vessels, whereby gravity and pressure in the system will continuously push the chemical liquid against the vessel bottoms before the chemicals exit the vessels, further ensuring against particle agglomeration.

The tubes connecting the storage vessels are angled downward to utilize gravity to ensure that no particle agglomeration occurs within said tubes. A vibrator is attached to the tubing next to an external level sensor, whereby the vibrator will be triggered periodically to shake off the slurry film accumulating on the inside of the tube walls before the slurry is permanently deposited to said walls. The use of this "Sen-Brator" (sensor+vibrator) is a marked improvement over conventional means whereby the use of float level sensors within the storage vessel and its associated contamination of the chemicals is eliminated.

For fab-wide continuous operation, air pressure forced into whichever embodiment of the storage vessels used then motivates the chemicals via another dispense line to the end-use area. The unused chemicals are then returned to receiving vessels, before eventually returning to the storage vessel for use again.

BRIEF DESCRIPTION OF THE DRAWINGS

The following drawings, when utilized in tandem with the detailed description of the invention below, shall help to further detail the operation and mechanism of the present invention.

DETAILED DESCRIPTION OF THE INVENTION

The present invention provides improved apparatus and process for the dilution and delivery of high-purity chemicals and CMP chemicals from one or more bulk sources to an end-user through the utilization of metered vessels, swingable angle pipes and a multiple-vessel storage vessel.

Figure 1:
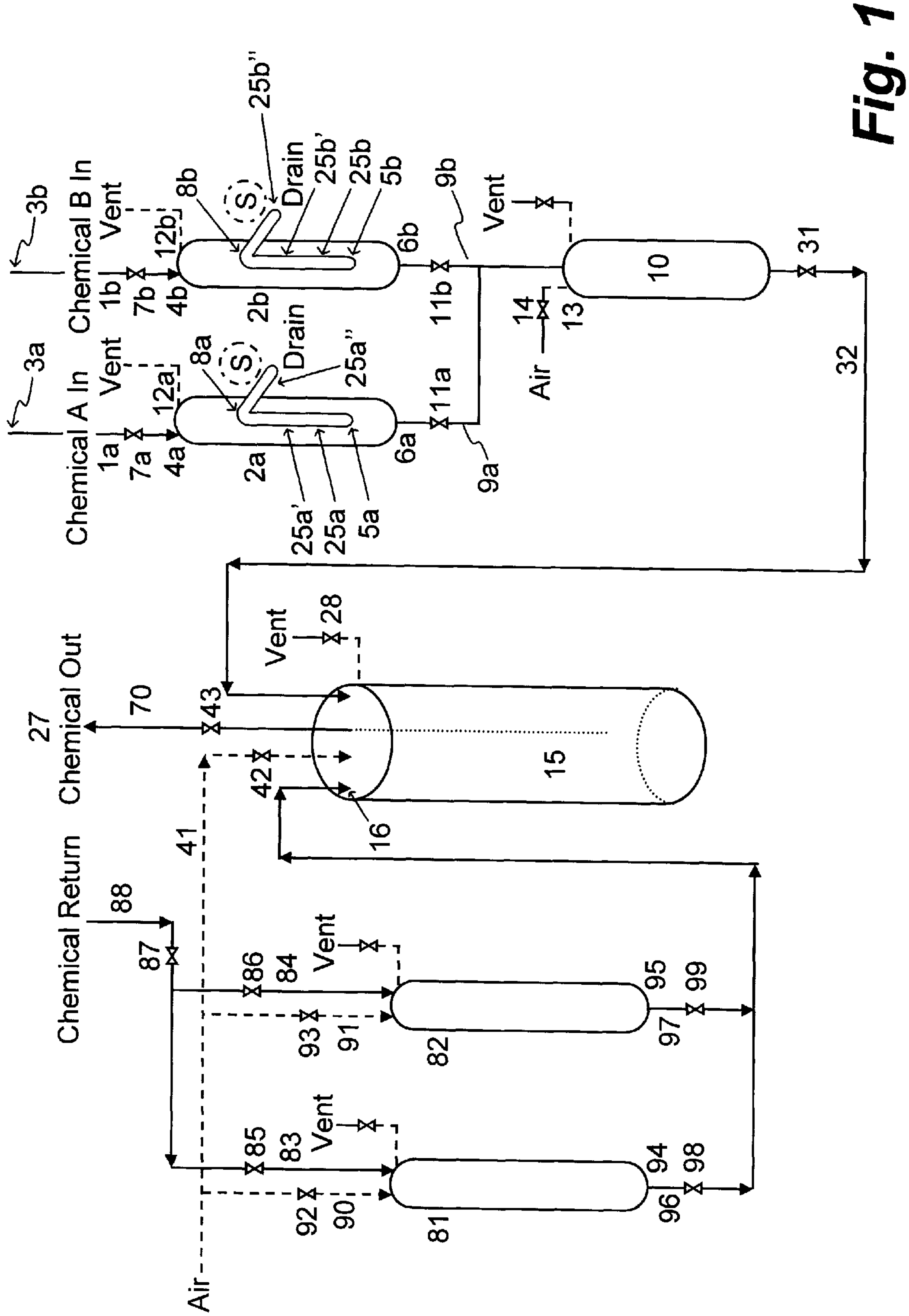
FIG. 1 is a schematic representation of the present invention with the first embodiment of the storage vessel of the present invention.

Illustrated in FIG. 1 is the first embodiment of the present invention. The chemicals are drawn by valve controlled pump or pressure via intake lines 1*a*, 1*b* into metered vessels 2*a*, 2*b* to measure out a predetermined amount of such chemicals prior to mixing. The first metered vessel 2*a* receives its chemical through the intake line 1*a* from a first bulk source 3*a* through a chemical inlet 4*a*. The second metered vessel 2*b* receives its chemical through the second intake line 1*b* from a second bulk source 3*b* through a chemical inlet 4*b*. The metered vessels 2*a*, 2*b* are vertically situated vessels with respect to a floor space or ground to which the apparatus according to the present invention may be securely installed. The metered vessels 2*a*, 2*b* are so constructed that the chemical inlets 4*a*, 4*b* are located at the top of the vessels, and a plurality of outlets located at both the side near the bottom of the vessels and at the bottom of the vessels as will be discussed later. It should be noted that the apparatus according to the present invention is not restricted to two metered vessels. The number of metered vessels may increase depending on the required number of chemicals to be utilized. The metered vessels may be in any shapes or sizes. However, the preferred metered vessels are cylindrical vessels which are two (2) to eight (8) inches in diameter and may be any length reasonably required.

To ensure a highly accurate mixing process whereby the amount of each chemical to be mixed is measured as accurately as possible, the metered vessels 2*a*, 2*b* each contain a highly responsive valve 7*a* or 7*b* on the intake lines 1*a*, 1*b*. The valves 7*a*, 7*b* operate by either manually or automatically opening and closing to allow and restrict flow of chemicals from their bulk sources after the triggering of a sensor as will be described below.

The metered vessels 2*a*, 2*b* further comprise swingable angle pipes 25*a*, 25*b* which are pivotally mounted externally to the outside of the metered vessels 2*a*, 2*b* near the bottom of such vessels via pivotally adjustable joints 5*a*, 5*b*. The swingable angle pipes 25*a*, 25*b* serve to monitor the fill levels up to a predetermined level in the metered vessels 2*a*, 2*b* before releasing excess chemicals by gravity flow in a simple, yet highly efficient manner. Each of the swingable angle pipes 25*a* or 25*b* comprises a first arm 25*a*' or 25*b*' and a second arm 25*a*" or 25*b*" to form thereof a ninety degree right angle passageway or conduit in-between these arms. As stated above, the swingable angle pipes 25*a*, 25*b* are pivotally mounted to the vessels 2*a*, 2*b* via the first arm 25*a*', 25*b*' to the pivotally adjustable joints to provide swingable movements for the swingable angle pipes 25*a*, 25*b*. The swingable angle pipes 25*a*, 25*b*, when viewed in their fully upright positions, swing upwards until portions of the swingable angle pipes 25*a*, 25*b*, which correspond to the ninety degree right angle passageway, reach to predetermined positions 8*a*, 8*b* to measure out a predetermined amount of the chemicals prior to mixing.

Figure 3:
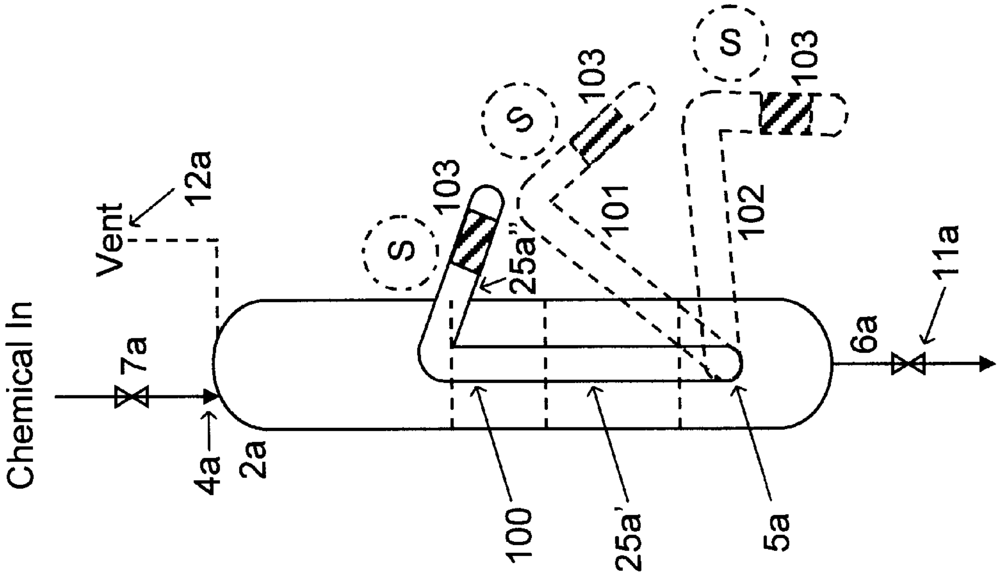
FIG. 3 is a detailed schematic representation of a metered vessel with the swingable angle pipe of the present invention.

Referring jointly to FIGS. 1 and 3, the fluid levels in the metered vessels 2*a*, 2*b* are controlled by the swingable angle pipes 25*a*, 25*b* via the following process: fluids within the metered vessels 2*a*, 2*b* rise as chemicals are drawn from their respective bulk sources. At the same time, the fluid rises in the swingable angle pipes 25*a* or 25*b* at the same level as in the metered vessel. When the levels of fluid reaches the point of the ninety degree right angles, the predetermined positions 8*a*, 8*b*, any excess fluid will then drain out by gravity flow via openings of the second arm 25*a*", 25*b*" until the fluid levels off at where the ninety degree downward angle of the pipe begins. To provide for lower amounts of fluid to be retained in the vessel, the swingable angle pipes 25*a*, 25*b* are simply swing downward so that the point of the ninety degree right angle of the swingable angle pipes is commensurate to a lower fluid level within the vessels 2*a*, 2*b*. To increase the amount of fluid to be retained in the vessels, the swingable angle pipes 25*a*, 25*b* are swing upward until the pipe drop off angle is commensurate with a higher level in the metered vessel.

The operation of the swingable angle pipes can be better comprehended by reference to FIG. 3. For the purposes of illustration, the swingable angle pipe 25*a* is at its highest upright position 100, whereby the most amount of fluid is retained in the vessel. When fluid level needs decrease, the swingable angle pipe 25*a* is swung down to lower example position 101 or even further down to a maximum point where the first arm 25*a*' of the swingable angle pipe 25*a* rests at a horizontal position 102 with respect to the floor space or ground. As the fluid exits the swingable angle pipe 25*a*, a sensor 103 attached at the end of the second arm 25*a*" senses the fluid and automatically shuts off the valve 7*a* on the intake lines 1*a* of the metered vessel 2*a*, thus preventing any more fluid to be drawn from the bulk source and any more than a nominal amount of such fluid from exiting the swingable angle pipe 25*a*. At any rate, the metered vessel 2*a* may be easily recalibrated as needed by running pre-measured amounts of chemicals through the vessel and then micro-adjusting the positions of swingable angle pipe 25*a*. The entire system is very flexible for preparing a wide range of chemical mixing ratios.

Utilization of such swingable angle pipes 25*a*, 25*b* eliminates the need for metering pumps, internal vessel sensors and costly automated systems and provides a simple and repeatable mechanism for measuring a predetermined amount of chemicals without control drift.

The precisely measured chemicals then exit the metered vessels via dispense lines 9*a*, 9*b* as depicted in FIG. 1 into a mixing vessel 10 where the chemicals are combined in any one of several conventional methods. The rate of flow and amounts of chemicals released are controlled by valves 11*a*, 11*b* along the dispense lines 9*a*, 9*b*. A vent 12*a* or 12*b* incorporated respectively into the top of the metered vessels 2*a*, 2*b* further ensures accurate fluid levels by allowing for the smooth flow of fluid out of the vessels.

Once in the mixing vessel 10, the chemicals are thoroughly mixed and diluted simply by being combined together through a gravity-flow process. Alternatively, a separate mixing vessel with a specialized mixing apparatus may be utilized if desired. Once mixed, the chemicals are ready to be transferred to a storage vessel 15. As mentioned, the mix vessel 10 may be pressurized via a controllable air pressure inlet 13 containing a valve 14, whereby the pressure motivates the mixed chemicals through the outlet at the bottom of the mixing vessel 10 to the storage vessel 15.

For high-purity chemicals, a standard pressure storage vessel 15 is utilized. The chemicals flow into the vessel are stored for immediate use as required. Chemical levels sensors attached to the storage vessel 15 measure the amount of chemicals available for immediate use. In operation, controlled air pressure fed via an air inlet 41 into the storage vessel 15 motivates the chemicals to their end-use area. The precisely regulated air pressure is fed through a valve 42 located on the air inlet 41 to assure accurate amounts of chemicals flow to the end-use area. Additionally, a valve 43 is placed on the a dispense line 70 to control the amount of chemicals fed out to the end-use area. Further, a back-pressure vent valve 28 incorporated into the storage vessel 15 ensures smooth flow of the chemicals to the end-user.

Figure 2:
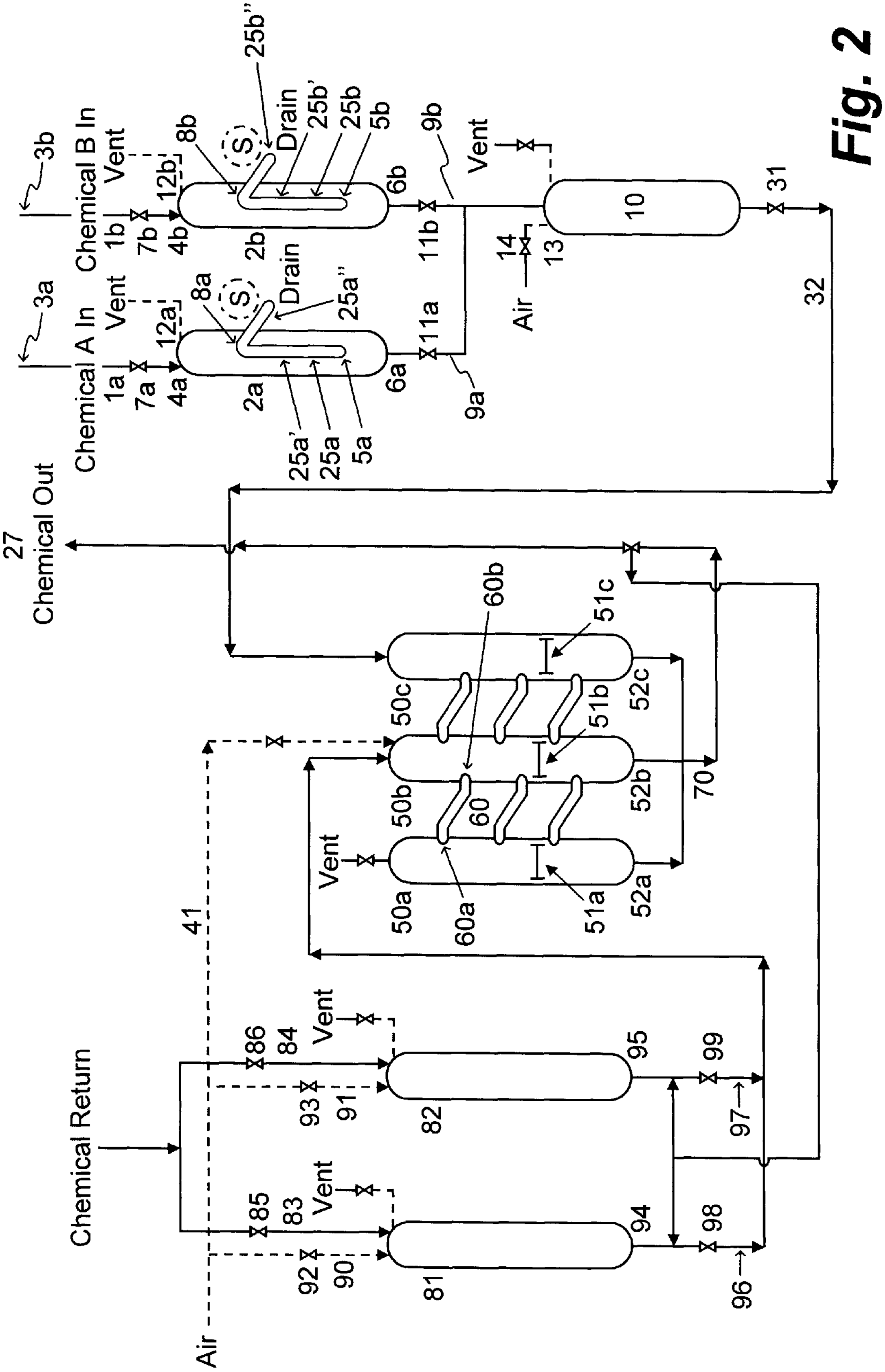
FIG. 2 is a schematic representation of the present invention with the second embodiment of the storage vessel for CMP chemical delivery utilizing multiple interconnected storage vessels in lieu of one storage vessel of the present invention.

The alternative embodiment of the storage vessel of the present invention is illustrated in FIG. 2. This embodiment addresses the tendency of CMP chemicals to agglomerate at the bottom of the vessel. In this embodiment according to the present invention the storage vessel takes the form of multiple vertically oriented side-by-side interconnected vessels 50*a*, 50*b*, 50*c*, as opposed to the more typical single large diameter vertical cylindrical vessel. This design addresses the current problems of CMP slurry particle agglomeration which may occur through the accumulation of particle deposited on the bottom of typical storage vessels. Having such multiple interconnected vessels 50*a*, 50*b*, 50*c*, the use of smaller diameter vessels as opposed to one large vessel becomes feasible. The interconnected vessels 50*a*, 50*b*, 50*c* are small in diameter 51*a*, 51*b*, 51*c*, so as to help to eliminate particle agglomeration problems evident in standard size storage vessels. The smaller diameters accomplish this through the following principle: generally, the larger the diameter of the storage vessel, the more surface area is evident at the bottom of such vessel, providing for more area for particles to accumulate. By decreasing the diameter size of the multiple vessels, less surface area is available on which the particles may accumulate.

The residence time of which the slurry chemicals resident in the interconnected vessels 50*a*, 50*b*, 50*c* shall be controlled as well. By properly controlling such residence time, defined as the volume of chemicals in the vessels divided by the flow rate, virtually all of the chemicals will be forced to flow out of the vessels without having the opportunity to agglomerate upon the vessel walls.

Additionally, an inherent deterrent against particle agglomeration is the process by which the chemicals are motivated through the interconnected vessels 50*a*, 50*b*, 50*c* through outlets 52*a*, 52*b*, 52*c* at the bottom of the vessels, where gravity and pressure in the system will continously push the chemical liquid against the vessel bottoms before the chemicals exit the vessels. This process, in conjunction with the controlled residence time described above, in effect "cleans" the vessel bottoms before the chemicals exit. A plurality of parallel interconnecting tubes 60 built between any adjacent pair of the interconnected vessels 50*a*, 50*b*, 50*c* have been specifically designed to address particle agglomeration as well. As shown jointly in FIG. 2 and FIG. 4 and for the purposes of illustration, the interconnecting tubes 60 provided by the present systems are designed to connect different vessels at uneven positions in which a first connecting point 60*a* on the first interconnected vessels 50*a* is placed higher relatively to the position of a second connecting point 60*b* on the second interconnected vessels 50*b* by the simple idea of angling the interconnecting tubes 60 downward to utilize gravity ensures that no particle agglomeration occurs within the interconnecting tubes 60.

Again, the design utilizes gravity and pressure to effectively "clean" the tubes before agglomeration has a chance to occur.

Figure 4:
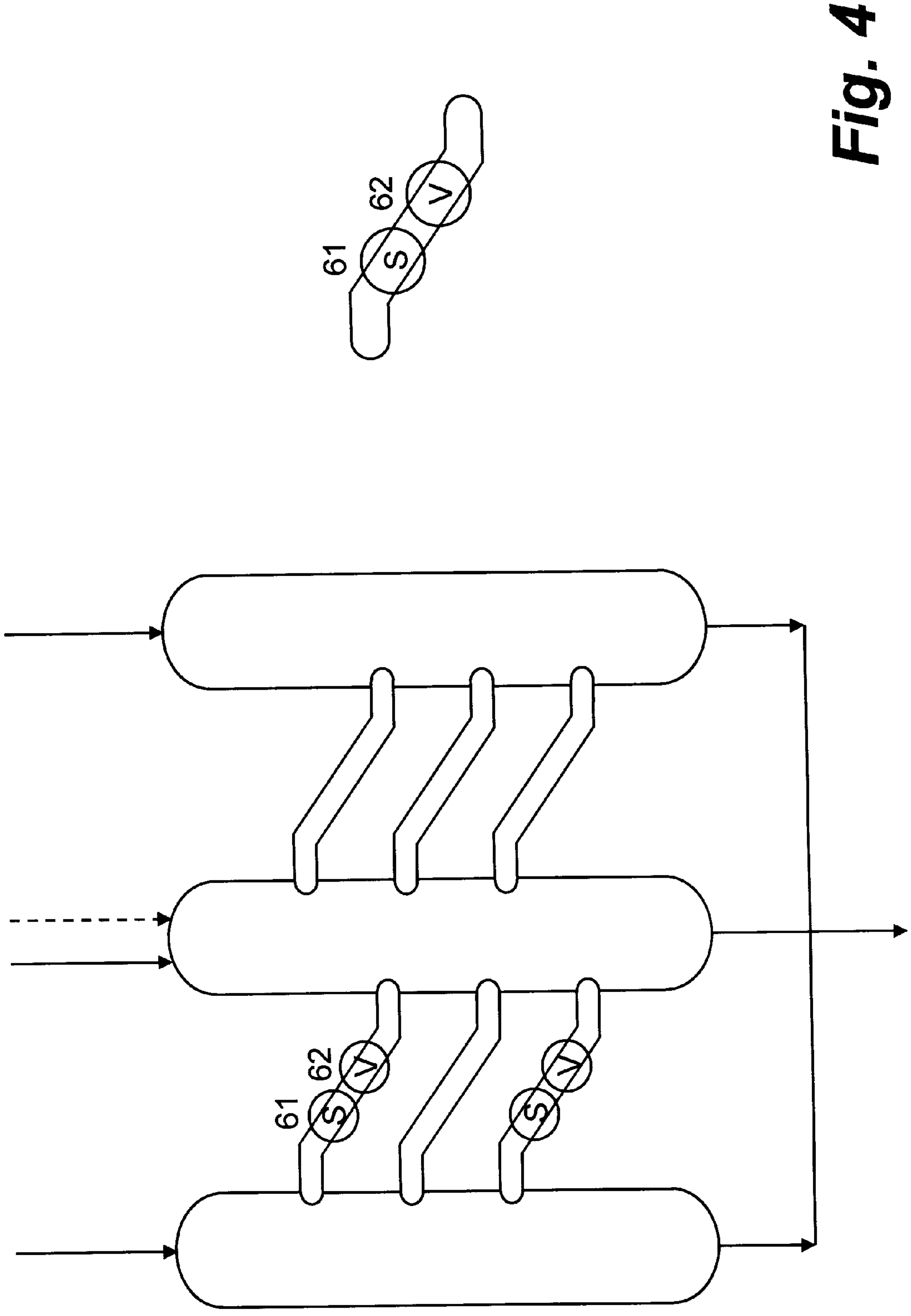
FIG. 4 is a detailed schematic representation of the Sen-Brator (sensor +vibrator) utilized in the storage vessels connecting tubes of the present invention.

As described above, the current problem associated with CMP slurry chemicals delivery is the tendency for such chemicals to permanently deposit slurry film on the tube walls, which obstruct the sensors from effectively measuring the chemical levels. To address this problem, many prior art systems attempt to use float sensors within the vessels to measure the chemical levels. The disadvantage, however, is that these float sensors come into direct contact with the chemicals, which is highly undesirable. As such, this present invention eliminates such disadvantage by utilizing external level sensors 61 and vibrators 62 which work in conjunction with the interconnecting tubes 60 as depicted in FIG. 4. The vibrating mechanism are attached to the interconnecting tubes 60 next to the external slurry sensor 61. From time to time, the vibrators 62 turn on and the resulting high frequency vibrations shake off any slurry film accumulating on the inside of walls of the interconnecting tubes 60 before the slurry is permanently deposited to said walls. This allows the use of external level sensors 61, which do not have the floating sensors' drawback of direct contact with the chemicals. The use of the externally located sensors is a marked improvement over conventional means, where the use of float level sensors that are in direct contact with the chemicals increases the risk of contamination.

It becomes readily apparent that the use of the multiple interconnected vessels 50*a*, 50*b*, 50*c*, the angled interconnecting tubes 60 and the externally located sensors and vibrators according to the present invention eliminate the need for any mixing or stirring mechanism within the storage vessel to prevent slurry agglomeration. Eliminating the mixing or stirring mechanism in turn eliminates the risk of stirring instrument degradation. Additionally, the present invention provides an effective design where the pressure-only system can be utilized for the delivery of slurry chemicals with its associated particle agglomeration problems without incorporation of a separate mixing mechanism.

For fab-wide continuous operation, valve controlled air pressure 41 fed into either the standard storage vessel embodiment in FIG. 1 or the multiple vessel storage vessel embodiment in FIG. 2 motivates the chemicals out via the dispense line 70 to the end-use area 27. The back-pressure vent valve 28 incorporated into one of the storage vessels ensures smooth flow of the chemicals to the end-user.

Referring back to FIG. 1, the fab-wide circulating chemicals is returning to two separate vessels 81, 82 via valve 85, 86 located on controlled dispense lines 83, 84. In the first storage vessel embodiment of FIG. 1, the chemical return is further controlled via a single valve 87 on a return line 88 before it splits. The two vessels 81, 82 are alternately used for the receiving of chemicals and transferring of such chemicals back to the storage vessels. The present systems utilize yet more level sensors to determine the amount of chemicals in the receiving vessels. By controlling the fill time of the receiving vessels by PLC internal timers through computer programming, instead of the use of level sensors, the current invention is simplified and eliminates yet another source of potential maintenance problems. Once the vessels have been filled, valve 92, 93 controlled air pressure is injected into the receiving vessels via inlets 90, 91 to motivate the chemicals back to the storage vessel 15 as shown in FIG. 1 or to the interconnected vessels 50*a*, 50*b*, 50 51 as shown in FIG. 2 respectively. The chemicals exit the receiving vessels via outlets 94, 95 along valve 98, 99 via dispense lines 96, 97 and travel back to enter the storage vessel via the return inlet 16. The entire cycle is then repeated again and again for fab-wide continuous operation.

Although the preferred embodiment of the invention has been disclosed for illustrative purposes, those skilled in the art will appreciate that various modifications, additions and substitutions are possible, without departing from the scope and spirit of the invention, as disclosed in the accompanying claims.

What is claimed:

1. An apparatus for precision mixing of chemicals from at least two bulk sources which comprises:

at least two metered vessels for receiving a predetermined volume of the chemicals from the bulk sources;

a swingable angle pipe comprising a first arm and a second arm perpendicular to each other to form a right angle passageway therebetween wherein the swingable angle pipe is pivotally mounted through the first arm to an adjustable joint near a bottom side of each of the metered vessels such that the swingable angle pipe is so positioned that the height between the right angle passageway and the adjustable joint determines the predetermined volume to be received by the swingable angle pipe and the correspondent metered vessels;

a mixing vessel for chemical mixing;

a first bulk intake line providing fluid communication between a first bulk source and the first metered vessel;

a second bulk intake line providing fluid communication between a second bulk source and the second metered vessel;

a dispense line providing fluid communication between the metered vessel and the mixing vessel;

a sensor attached at the end of the second arm of the swingable angle pipe to detect the flow of the chemicals through the right angle passageway to the second arm when the chemicals have reached the predetermined volume in the metered vessels so as to assure cessation of chemical flow by sending a shut-off signal to valves on the first and second bulk intake lines between the bulk sources and the metered vessels; and wherein the predetermined volume in the metered vessels is adjustable by changing the height between the right angle passageway and the adjustable joint through upward or downward swinging of the swingable angle pipe such that any fluids in excess of the predetermined volume will drain out by gravity flow through a opening of the second arm.

2. The apparatus according to claim 1 further comprises a dispense line providing fluid communication between the mixing vessel and at least one down-stream facility.

3. The apparatus according to claim 1 wherein the first and second bulk intake lines are further connected to a valve controlled pump or pressure line to draw the chemicals to the metered vessels.

4. The apparatus according to claim 1 wherein the adjustable joint is pivotally adjustable to provide swingable movements for the swingable angle pipe.

5. The apparatus according to claim 1 wherein each of the metered vessels further includes a vent on a top side of the metered vessel to ensure accurate and smooth flow of fluid out of the metered vessel.

6. A process for precision mixing of chemicals from at least two bulk sources which comprises;

providing at least two metered vessels for receiving a predetermined volume of the chemicals from the bulk sources;

providing a swingable angle pipe comprising a first arm and a second arm perpendicular to each other to form a right angle passageway therebetween wherein the swingable angle pipe is pivotally mounted through the first arm to an adjustable joint near a bottom side of each of the metered vessels such that the swingable angle pipe is so positioned that the height between the right angle passageway and the adjustable joint determines the predetermined volume to be received by the swingable angle pipe and the correspondent metered vessels;

providing a mixing vessel for chemical mixing;

providing means for fluid communication between the bulk sources and the metered vessels;

providing means to transfer chemicals between the metered vessel and the mixing vessel;

providing a sensor attached at the end of the second arm of the swingable angle pipe to detect the flow of the chemicals through the right angle passageway to the second arm when the chemicals have reached the predetermined volume in the metered vessel so as to assure cessation of chemical flow by sending a shut-off signal to the means for fluid communication between the bulk sources and the metered vessels;

providing a conduit from the mixing vessel to at least one down-stream facility; and wherein precision mixing is accomplished by motivating chemicals from the respective bulk sources into the metered vessels and the swingable angle pipe until the chemical levels reaches the predetermined volume, determined by the height between the right angle passageway and the adjustable joint, at which point the sensor sends a shut-off signal to the means for fluid communication between the bulk sources and the metered vessels and allows any excess fluid to drain out by gravity flow via openings of the second arm until the fluid levels off near the bottom of the right angle passageway.

7. The process for precision mixing of chemicals according to claim 6 wherein the means for fluid communication between the bulk sources and the metered vessels includes a first and a second bulk intake lines.

8. The process for precision mixing of chemicals according to claim 6 wherein the means for fluid communication between the bulk sources and the metered vessels includes a dispense line.

9. An apparatus for providing mixing, transfer and delivery of chemicals in a chemical mechanical planarization ("CMP") to reduce slurry particle agglomeration from a bulk source to an end-use station which comprises:

at least one metered vessel for receiving a predetermined volume of the chemicals from the bulk source;

a swingable angle pipe comprising a first arm and a second arm perpendicular to each other to form a right angle passageway therebetween wherein the swingable angle pipe is pivotally mounted through the first arm to an adjustable joint near a bottom side of the metered vessel such that the swingable angle pipe is so positioned that the height between the right angle passageway and the adjustable joint determines the predetermined volume to be received by the swingable angle pipe and the correspondent metered vessel;

a mixing vessel for chemical mixing;

a bulk intake line providing fluid communication between the bulk source and the metered vessel;

a dispense line providing fluid communication between the metered vessel and the mixing vessel;

a plurality of small diameter vessels for storage of chemicals after delivery from the mixing vessel, the small diameter vessels connected to each other through a plurality of interconnecting tubes wherein the interconnecting tubes are spatially parallel arranged among them, yet non-horizontally disposed between the small diameter vessels so as to utilize gravity to minimize particle agglomeration within the interconnecting tubes; and wherein the chemicals is motivates through a valve controlled air pressure from the small diameter vessels to the end-use station.

10. The apparatus for providing mixing, transfer and delivery of chemicals in a chemical mechanical planarization ("CMP") to reduce slurry particle agglomeration according to claim 9 further comprises a vibrators and an external sensors attached on the interconnecting tubes to provide high frequency vibration to the interconnecting tubes to shake off particle agglomeration when the sensor detects accumulation of the chemicals within the interconnecting tubes.

11. An apparatus for providing transfer and delivery of chemicals in a chemical mechanical planarization ("CMP") to reduce slurry particle agglomeration from a bulk source to an end-use station which comprises:

a source vessel to provide the chemicals for CMP;

a plurality of small diameter vessels for storage of the chemicals after delivery from the source vessel, the small diameter vessels connected to each other through a plurality of interconnecting tubes wherein the interconnecting tubes are spatially parallel arranged among them, yet non-horizontally disposed between the small diameter vessels so as to utilize gravity to minimize particle agglomeration within the interconnecting tubes; and wherein the chemicals is motivates through a valve controlled air pressure from the small diameter vessels to the end-use station.

12. The apparatus for providing transfer and delivery of chemicals in a chemical mechanical planarization ("CMP") to reduce slurry particle agglomeration according to claim 11 further comprises a vibrators and an external sensors attached on the interconnecting tubes to provide high frequency vibration to the interconnecting tubes to shake off particle agglomeration when the sensor detects accumulation of the chemicals within the interconnecting tubes.

* * * * *